United States Patent
Kallstrom et al.

(10) Patent No.: US 9,398,053 B2
(45) Date of Patent: Jul. 19, 2016

(54) EFFICIENT DATA TRANSMISSION BETWEEN COMPUTING DEVICES

(71) Applicant: Microsoft Corporation, Redmond, WA (US)

(72) Inventors: Erik Jonas Kallstrom, Redmond, WA (US); Kevin R. Hughes, Redmond, WA (US); Stanislav S. Kuvshinov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 418 days.

(21) Appl. No.: 13/691,826

(22) Filed: Dec. 2, 2012

(65) Prior Publication Data

US 2014/0156866 A1 Jun. 5, 2014

(51) Int. Cl.
*H04L 29/06* (2006.01)
*G06F 9/455* (2006.01)
*H04L 29/08* (2006.01)

(52) U.S. Cl.
CPC ........ *H04L 65/1013* (2013.01); *G06F 9/45533* (2013.01); *H04L 67/06* (2013.01); *H04L 67/42* (2013.01)

(58) Field of Classification Search
CPC ................................. G06F 17/30; G06F 15/16
USPC .......................................... 709/232; 707/769
See application file for complete search history.

(56) References Cited

U.S. PATENT DOCUMENTS

| 7,937,379 B2 | 5/2011 | Ganesan et al. |
| 8,078,686 B2 | 12/2011 | Sjoblom et al. |
| 8,108,403 B2 | 1/2012 | Gopalraj et al. |
| 2007/0035764 A1 | 2/2007 | Aldrich et al. |
| 2009/0271779 A1 | 10/2009 | Clark |
| 2011/0087690 A1* | 4/2011 | Cairns ........................... 707/769 |
| 2011/0196822 A1 | 8/2011 | Zunger et al. |
| 2012/0233293 A1* | 9/2012 | Barton et al. ................. 709/219 |

OTHER PUBLICATIONS

Mantri, Gaurav, "Comparing Windows Azure Blob Storage and Google Cloud Storage", Jun. 1, 2012, Available at: http://gauravmantri.com/2012/06/01/comparing-windows-azure-blob-storage-and-google-cloud-storage/, 16 pages.

Dabas, Nikhil, "Ways to Achieve Deduplicated File Storage within Amazon S3?", Retrieved on: Oct. 12, 2012, Available at: http://stackoverflow.com/questions/7410203/ways-to-acheive-de-duplicated-file-storage-within-amazon-s3, 2 pages.

(Continued)

*Primary Examiner* — Ario Etienne
*Assistant Examiner* — Sahera Halim
(74) *Attorney, Agent, or Firm* — Henry Gabryjelski; Kate Drakos; Micky Minhas

(57) ABSTRACT

The subject disclosure is directed towards technology by which data transmission sizes are reduced when uploading files over a network. By processing hash values corresponding to a plurality of data blocks of a file to potentially be uploaded to a server, the server identifies any already known data block or blocks of the file. The server performs a server-local copy operation that writes the known data block into a server-local copy of the file. If applicable, the server returns hash values corresponding to unknown data blocks to a client, by which the client responds by uploading copies of the unknown data blocks. Accordingly, the client and the server maintain the server-local copy of the file by transferring only unknown data blocks.

20 Claims, 6 Drawing Sheets

(56) References Cited

OTHER PUBLICATIONS

Rai, Rahul, "Reliable Uploads to Windows Azure Blob Storage Via an HTML5 Control.", Retrieved on: Oct. 12, 2012, Available at: http://msdn.microsoft.com/en-us/library/windowsazure/hh824678.aspx, 14 pages.

"International Search Report and Written Opinion for PCT Application No. PCT/US2013/072661", Mailed Date: Mar. 17, 2014, Filed Date: Dec. 2, 2013, 9 pages.

* cited by examiner

EFFICIENT DATA TRANSMISSION BETWEEN COMPUTING DEVICES

BACKGROUND

A number of organizations employ a local area network to facilitate data communications between various devices (e.g., computing devices, peripheral devices, storage devices and/or the like). Within a typical local area network, a server computer (often simply referred to as a server) performs various data processing/storage tasks—often at the direction of a client computer (often simply referred to as a client). To illustrate one example, the client initiates a file upload process by transmitting a whole file to the server for storage in network-accessible memory.

Uploading files having substantially large data sizes to a server in a traditional client/server network environment is costly in terms of total time consumed, dollars spent and/or computing resources required, including network bandwidth and/or storage capacity. Uploading substantially similar or the same files, whether from various clients or repeatedly from a same client, also incurs significant costs and/or delays. In particular, poor or inadequate network connectivity exacerbates the cost associated with completing a file upload process. A file upload process also may be hindered or restricted by a current network environment. Servers running on certain networks, such as a cloud resource, are designed to timeout file upload requests after a pre-determined threshold time period elapses. Other networks prohibit file uploads that exceed a pre-determined payload size.

Previous solutions prescribe performing file uploads in piecemeal by splitting a file into chunks and uploading each chunk separately. Such solutions, however, are impractical when uploading files of considerable sizes. To demonstrate one such impracticality, if a single chunk upload fails, the entire file upload process is restarted. A more efficient solution for uploading files is desired.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards efficient data transmissions over a network when uploading files. In one aspect, while preparing a file for uploading, a computing device referred to as a client removes certain data blocks, including any data block that is, without uploading any portion thereof, reconstructible at the server. Some of the certain data blocks have been initialized to particular default data and do not need to be transmitted because the server recreates these data blocks using one or more server default storage values. In another aspect, the client excludes extraneous copies of redundant data blocks. Eliminating these blocks from the file upload process reduces a total length of time to complete the transfer of remaining data blocks.

In one aspect, a server coupled to the client processes hash value data corresponding to each data block of the file and identifies one or more locally stored data blocks. In another aspect, the server returns hash value data for any data block that is unknown to the server and/or not found in the server's data store, which allows the client to reduce file upload-related traffic by uploading unknown data blocks. In yet another aspect, the server employs a library comprising reconstructible and/or reusable data blocks to determine which data blocks of the file are known and which data blocks are unknown. The storage logic uses the library to identify reusable and re-constructible data blocks, within the same file or between similar instances of a same type of file. Accordingly, the file upload size reduction approaches described herein are applicable to any file type.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards more efficient file uploads to a server through file upload size reduction. The technology described herein exemplifies a number of approaches for achieving such a reduction. Various software/hardware components initiate and execute file upload processes from one or more computing device to one or more stores. In one example implementation, using a storage logic coupled to a server, a computing device, referred to as a client, determines whether a particular file includes one or more data blocks that are already stored on the server and if possible, which data blocks are not found on the server and therefore, considered to be unknown data blocks.

One example implementation utilizes a server-stored common data block library comprising reusable and re-constructible data blocks. The volume of data being transferred from the client to the server during each upload process may be significantly reduced by constructing at least part of the file on the server from the data blocks stored in the block library. Accordingly, only those data blocks not found in the library are actually transferred over the network. The client only uploads the unknown blocks because the any known data block can be locally copied from the library instead of over the network.

It should be understood that any of the examples herein are non-limiting. For instance, one example describes uploading virtual machine files, such as Virtual Hard Disk (VHD) files, to Microsoft® Windows® Azure-Based Storage, which represents one example embodiment where the file upload optimization approaches described herein improve a total time to upload a given VHD file over traditional client/server network environments. With a common data block library residing in Microsoft® Windows® Azure-Based Storage and populated with data blocks representing a virtual hard disk containing a clean Microsoft® Windows® Operating System installation, uploading a portion of a VHD is more efficient as compared to uploading the entire VHD file. However, this is only one example, and other file types, environments and the like may similarly benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data communication in general.

Figure 1:
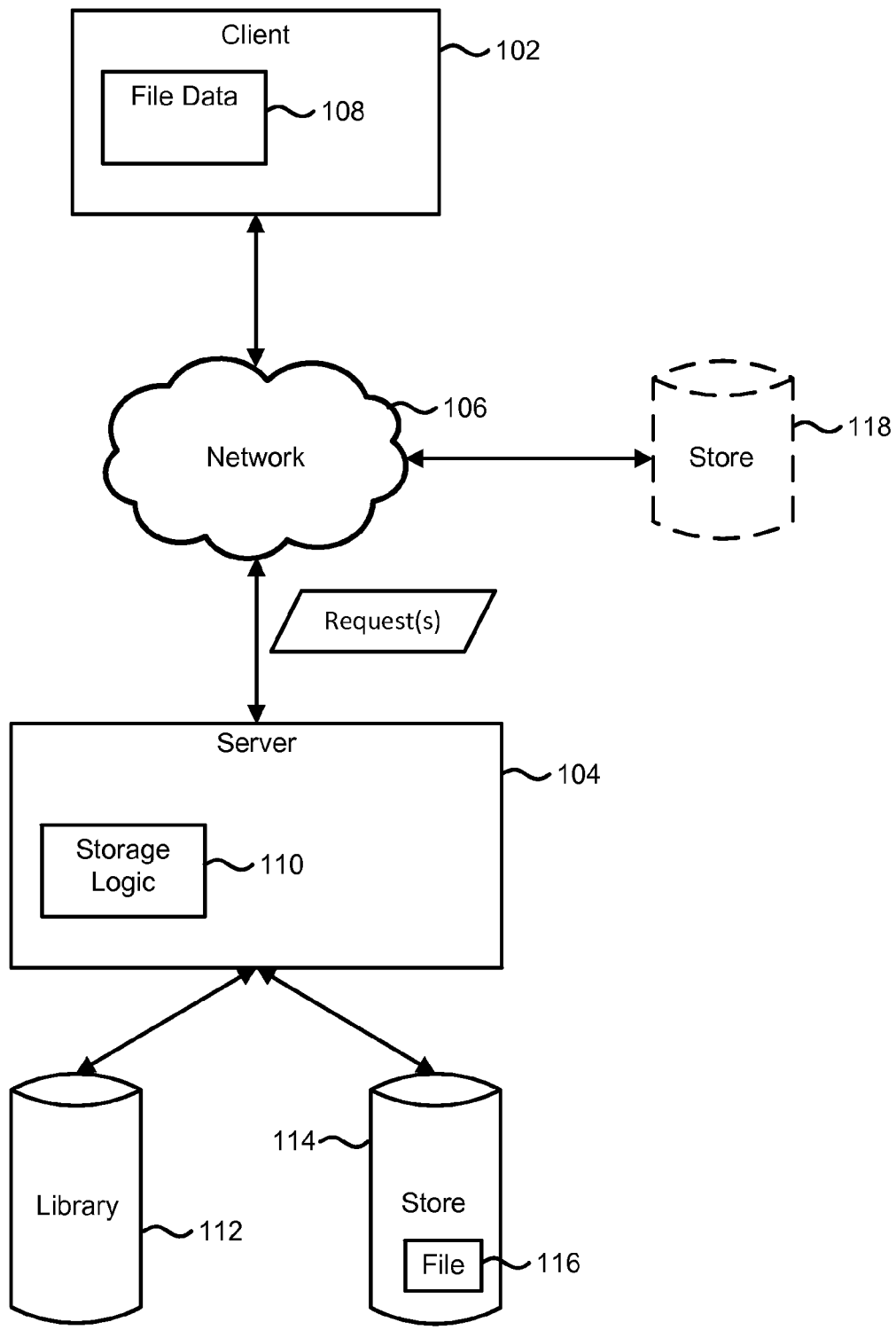
FIG. 1 is a block diagram illustrating an example system for reducing data transmission size when uploading file data according to one or more example implementations.

FIG. 1 is a block diagram illustrating an example system for reducing data transmission size when uploading file data according to one example implementation. Example components of the example system include a client 102 and a server 104 that communicate various data with each other via a network 106. The server 104 may be configured to support the client 102 with computing operations, including those pertaining to file data 108 as described herein.

The client 102 may refer to a computing device comprising various software and/or hardware components. Although some embodiments of the client 102 include a desktop computer, a laptop computer, a mobile device and/or the like, it is appreciated that additional embodiments are envisioned by the present disclosure.

According to one example implementation that achieves file upload size reduction, because certain file structure patterns are recognizable, the client 102 may filter data blocks having such patterns from the file data 108. For instance, when storage space associated with the server 104 is allocated, data within such storage space is initialized to a particular (default) value (e.g., referred to as a server-default-storage-value). The client 102 may reduce a data transmission size when uploading the file data 108 by removing any data block comprising the particular value and only transmitting those data blocks not equal to that particular value. To illustrate an example, if a data block is initialized to a default value of zero (0) upon allocation, the client 102 does not upload that data block to the server 104.

The server 104 may be configured to provide the client 102 with various computing resources/services, such as storage logic 110 configured to handle file upload requests from the client 102. In order to complete these file upload requests, the storage logic 110 may use a library 112 associated with common data blocks located within one or more stores, including locally attached data stores. As an example, for each common data block, the library 112 may include a corresponding hash value and a copy of/reference to each redundant memory location within a store 114. In one example implementation, the storage logic 110 regulates a size of the library 112 by culling out seldom accessed data blocks. The storage logic 110 may maintain the library 112 at a pre-determined maximum size.

According to one example implementation, the client 102 initiates an upload process by partitioning the file data 108 into a plurality of data blocks and computing hash value data and offset information for each data block. The client 102 may remove redundant data blocks and record each file offset in the offset information such that a data block of the plurality of data blocks may map to more than one file offset. Before transmitting any of the plurality of data blocks to the server 104, the client 102 issues at least one file upload request comprising the hash value data that corresponds to at least a portion of the plurality of data blocks. In response to the at least one file upload request, the storage logic 110 searches the library 112 for matching hash values indicating at least a portion of the file data 108 to be known and/or retrievable via a local network copy operation. For each hash value in the library 112 that substantially/exactly matches a hash value in the hash value data, the storage logic 110 identifies a corresponding common data block and labels that data block to be a known data block of the plurality of data blocks.

Proceeding with the upload process for the file data 108, the storage logic 110 retrieves a copy of each known data block from the store 114, and/or one or more other stores, via the network 106. Using the offset information provided by the client 102, the storage logic 110 constructs a server-local copy comprising at least a portion of the file data 108. The storage logic 110 creates a file 116 to store the server-local copy and represent a reconstruction of the file data 108 at the store 114. According to one example implementation, the storage logic 110 writes each known data block to corresponding file offsets within the server-local copy. Alternatively, the storage logic 110 may include a reference within the server-local file copy 116 to a memory location, in the library 112, the store 114 and/or another store, corresponding to a known data block instead of creating a copy.

The storage logic 110 may initially seed the library 112 with a set of commonly used data blocks. Optionally, the storage logic 110 uses other data stores, besides the store 114, to identify commonly used data blocks. The storage logic 110 may search a store 118 for new data blocks to record in the library 112 and add to the store 114. The store 118 may be located on a same local area network as the client 102 and the server 104 or, alternatively, the store 118 may be located on a cloud-based server in a private or public cloud environment.

Figure 2:
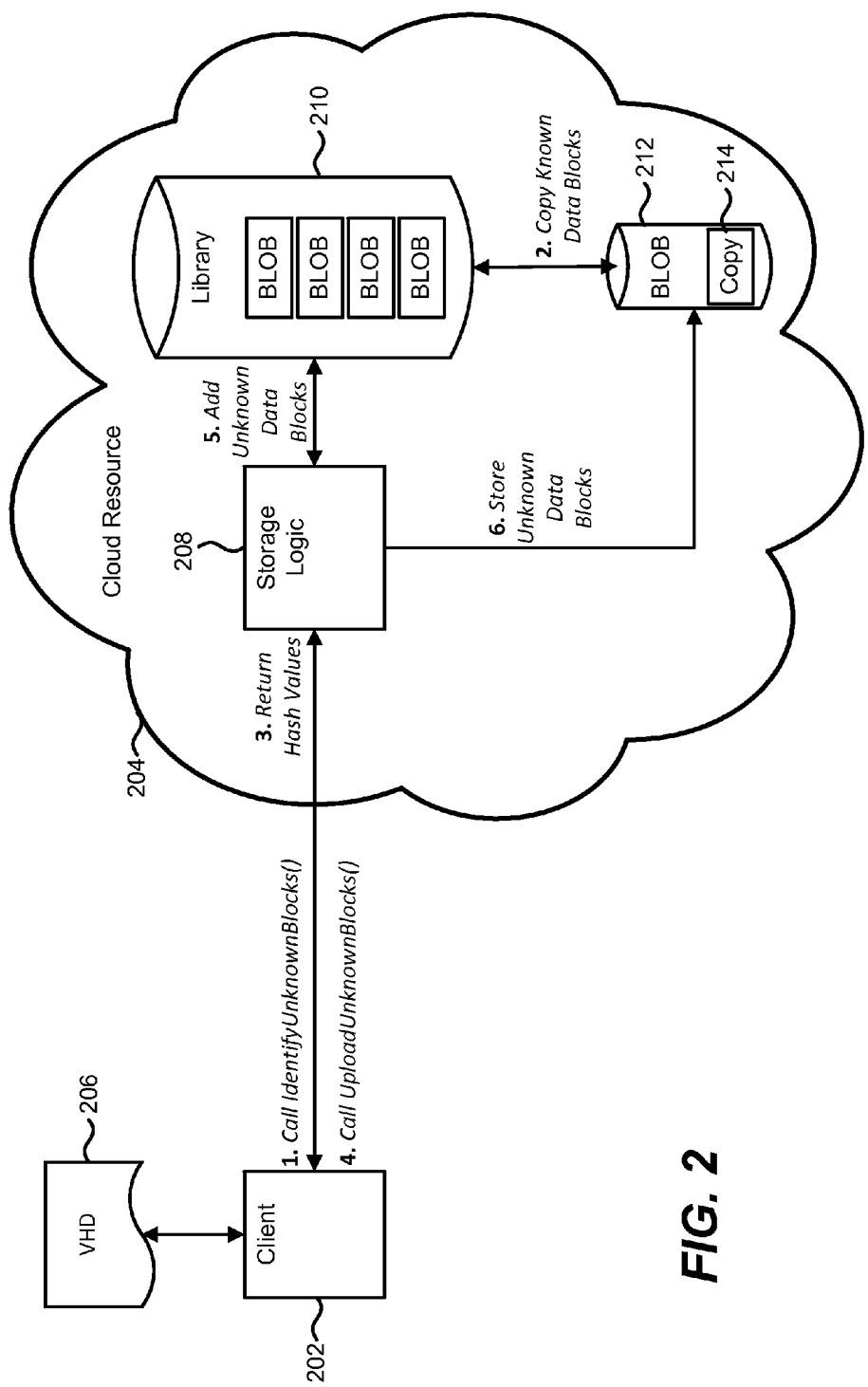
FIG. 2 is a block diagram representing an example architecture through which known file data is locally copied and unknown file data is uploaded onto a cloud resource according to one or more example implementations.

FIG. 2 is a block diagram representing an example architecture through which known file data is locally copied and unknown file data is uploaded according to one example implementation. Although the example architecture may be utilized in a cloud computing embodiment, as illustrated, it is appreciated that the example architecture described below is applicable to other computing environments. An on-premises server cluster represents one example embodiment of another computer computing environment in which the example architecture may facilitate efficient file uploads by reducing file upload size.

A client 202, which may be any computing device, desires to upload various files for storage on a cloud resource 204. FIG. 2 depicts example implementations of the example architecture in which the client 202 initiates a request to upload a single file, for example, a large virtual machine file, such as a virtual hard disk 206 (VHD). Optionally, the client 202 may communicate a plurality of file upload requests in parallel such that each upload request corresponds to a specific portion of the virtual hard disk 206. Each request queues a set of hash values for a function call or the like to the cloud resource 204. A storage logic 208, running within the cloud resource 204, processes the request and after determining which data blocks are known/unknown, responds to the client 202 with a file upload complete status or information identifying each unknown data block. Alternatively, the response to the client 202 may identify each known data block. Using known data blocks from a library 210 comprising common data blocks, the storage logic 208 creates a copy of at least a portion of the virtual hard disk 206. The client 202, if necessary, responds with data transmissions of unknown data blocks in order to complete the file upload process.

In one example implementation, the cloud resource 204 generally exposes an application programming interface (API), such as a REST-based API, enabling functionality over a block library comprising common data blocks, operation with a cloud-based file system and/or access to other higher-level language code packages. The cloud resource 204 may be configured to provide file uploading/downloading services to a plurality of clients, including the client 202, by utilizing one or more file types to store data from these clients. Because some cloud computing environments involve pricing plans that charge on the basis of total data uploaded, the client 202 may benefit from the savings attributed to smaller file upload sizes. Various example embodiments of the cloud resource 204 employ a file type referred to as a BLOB (Binary Large Object) and a container file type for storing one or more BLOBs. Microsoft® Windows® Azure-Based Storage represents one example cloud resource in which block-based BLOBs typically store streaming data (e.g., images, videos, documents and so forth).

Residing within the cloud resource 204, the library 210 may include a BLOB-based file system through which data block reads/writes are completed. According to one or more example implementations, the library 210 comprises a plurality of data blocks that, when arranged at appropriate offsets, form a plurality of BLOBs. The library 210 may store the plurality of data blocks in a contiguous address space where each data block's hash value maps to a particular block identifier or, alternatively, in random locations such that each data block's hash value forms at least a portion of that data block's address.

The library 210 may be referred to herein as a data block library or simply a block library. At least a portion of the library 210 includes data blocks that are common to the cloud resource 204 (e.g., commonly used/selected data blocks). It is appreciated that the library 210 also may include data blocks from other libraries and/or stores. For example, the storage logic 208 may scan local and/or network-accessible data stores and identify data blocks to add to the library 210. According to another example implementation where data blocks are added to the library 210, the storage logic 208 may access a different library comprising common data blocks that is located on another server configuration, such as another cloud resource (e.g., a public cloud or a private cloud) or an on-premises server with respect to the client 202. Furthermore, when the client 202 uploads new data blocks that are not found in the library 210, the new data blocks also are added to the library 210, which benefits other users involved in uploads of similar files to the cloud resource 204.

To upload the virtual hard disk 206 or a portion of the virtual hard disk 206, the client 202 may call a function (e.g., a PUT function in BLOB-based storage) to initiate an upload process in accordance with the API. The storage logic 208, in turn, may add the virtual hard disk 206 to cloud-based file system, such as a BLOB-based system, by constructing a BLOB 212 to maintain a copy 214 (e.g., a local copy) of at least one portion the virtual hard disk 206 and providing the client 202 with access to the BLOB 212. Hence, the virtual hard disk 206 is reconstructed on the cloud resource 204 in the form of the copy 214, which may be herein referred to as the virtual hard disk copy 214, while avoiding uploading of unnecessary data blocks.

In compliance with the example architecture, the client 202 partitions the virtual hard disk 206 into a plurality of data blocks of fixed size (e.g., five-hundred and twelve (512) KB) in one example implementation. According to other example implementations, the example architecture may be adaptable to different data block sizes in order to maximize data block reuse in a block library and/or minimize a number of data block transmissions during file uploads. For each data block in to the virtual hard disk 206, the client 202 may assign an identifier (e.g., a Base64 encoded string value referred to as a block identifier or BlockId).

The client 202 communicates the block identifiers to the storage logic 208 in order to determine which data blocks are known in the library 210 and which data blocks are unknown and/or not found in the library 210. The storage logic 208 performs local copying of the known data blocks from the library 210 to corresponding file offsets in the virtual hard disk copy 214. Once all unknown/new data blocks are uploaded successfully, the client 202 calls another function (e.g., a PUT Block List function) instructing the storage logic 208 to commit and/or write the uploaded data blocks to corresponding file offsets in the virtual hard disk copy 214.

The following illustrates file upload size reduction where at least one example implementation of the client 202 scans the virtual hard disk 206 in order to identify data blocks comprised substantially or entirely of default data (e.g., server-default-storage-values). If the cloud resource 204 is configured to initialize storage space to a value of zero (0), the client 202 identifies any data block within the virtual hard disk 206 comprising only zeros and precludes that data block from being uploaded to the cloud resource 204.

For each remaining data block, the client 202 computes an identifying hash value and a set of file offsets corresponding to one or more addresses/locations within the file. Because a data block may be used at multiple locations within the virtual hard disk 206, the set of file offsets includes a corresponding file offset for each redundant location. In one example implementation, the client 202 produces the set of file offsets by aggregating data blocks having a same hash value, which enables the client 202 to transmit only one copy of a redundant data block instead of multiple copies. When applied to uploading the virtual hard disk, such an aggregation reduces a data transmission size since there is no need for the client 202 to upload numerous copies of the same redundant data block.

According to one example implementation, as the client 202 aggregates the hash values and builds offset information, the client 202 arranges the hash values into N groups of M hash values where N and M are configurable values used to throttle the number of calls made to the server during the upload process. Once there is a group of M hash values, that group is queued for a function call directed towards the storage logic 208.

In one example implementation, the storage logic 208 exposes at least two functions to the client 202, including a first function configured to identify one or more known data blocks within the library 210 and a second function configured to upload new, unknown data blocks to the cloud resource 204. FIG. 2 depicts the first function and the second function as IdentifyUnknownBlocks( ) and UploadUnknownBlocks( ) respectively.

FIG. 2 generally illustrates a file upload process using the example architecture in which certain distinct operations of the file upload process are presented via numeric labels (e.g., 1, 2, 3 . . . and so forth). Operation One (1) depicts the client 202 commencing the file upload process with an initial function call IdentifyUnknownBlocks( ). As a parameter to IdentifyUnknownBlocks( ), the client 202 may communicate a list of hash values corresponding to a plurality of data blocks that form at least a portion of the virtual hard disk 206.

Executing the function call IdentifyUnknownBlocks( ) may entail the storage logic 208 to generate the virtual hard disk copy 214 and/or if applicable, to copy known data blocks to the BLOB 212 as depicted by Operation Two (2) in FIG. 2. The storage logic 208 may compare the list of hash values with the library 210 to determine whether any hash value resolves to a common data block. If, for instance, the library 210 includes at least one matching hash value, the storage logic 208 performs a local copy operation for at least one common data block that corresponds to the at least one matching hash value such that the at least one common data block is stored at corresponding file offsets in the virtual hard disk copy 214.

At Operation Three (3), the storage logic 208 is instructed to return one or more hash values to the client 202 that are not found in the library 210, as depicted in FIG. 2. For every hash value returned, the client 202 reads a data block from the virtual hard disk 206 starting at one of the corresponding file offsets. Optionally, the client 202 applies a compression algorithm to reduce a number of bytes uploaded. Before adding a compressed data block to the library 210, the storage logic 208 performs a complementary decompression operation by which the compressed data block reverts back to an uncompressed data block.

After generating a copy of each and every unknown block of the virtual hard disk 206, the client 202 performs Operation Four (4) as depicted in FIG. 2 and proceeds to call UploadUnknownBlocks( ) with the unknown data block copies as parameters. At Operation Five (5), the storage logic 208 may add the unknown data blocks into the library 210 along with identifying hash values, including the returned hash values to the function call IdentifyUnknownBlocks( ) at Operation Three (3). As an alternative, the storage logic 208 uses other authentication data (e.g., a corresponding hash string) as a block identifier for each unknown data block. FIG. 2 illustrates Operation Six (6) with the storage logic 208 proceeding to store the unknown data blocks at corresponding file offsets in the virtual hard disk copy 214.

In yet another example implementation involving uploading files to the cloud resource 204, the client 202 updates the virtual hard disk copy 214 as new data and/or modified data is written to the virtual hard disk 206. As described herein, the client 202 uploads at least a portion of the virtual hard disk 206 corresponding to a particular point in time; and in turn, the storage logic 208 uses the uploaded portion(s) to generate the virtual hard disk copy 214 of the virtual hard disk 206.

As the virtual hard disk 206 changes (e.g., by installing a software component or creating a new document), the client 202 may refresh the virtual hard disk copy 214 with differential data, for example, by updating certain data blocks within modified data, removing deleted data blocks and/or adding new data blocks. Once completed, the virtual hard disk copy 214 becomes transformed into a virtual hard disk associated with a more current point in time. By using the storage logic 208 to (e.g., periodically) update the virtual hard disk copy 214, the client 202 realizes costs savings with each upload.

The client 202 may instruct the storage logic 208 to identify each and every known data block within the differential data. The storage logic 208, using hash values associated with the modified and/or new data blocks, searches the library 210 for data blocks having matching hash values. If such a data block is found, the storage logic 208 performs a local copy operation that writes the found/known data block to the virtual hard disk copy 214. With respect to any modified and/or new data block not found in the library 210 and thus deemed unknown, the client 202 uploads each such data block to the cloud resource 204, as described herein. The storage logic 208, in turn, stores each unknown data block at corresponding file offsets in the virtual hard disk copy 214.

Thus, instead of replacing unchanged data blocks of the virtual hard disk copy 214, the client 202 uploads only the modified and/or new data blocks that are also not found in the library 210. The client 202 may, alternatively, update the virtual hard disk copy 214 by transmitting the modified and/or new data blocks, regardless of whether a data block is known or unknown. This alternative implementation may be applied in order to avoid latencies resulting from querying the library 210 if such latencies negate the savings in reducing data transmission sizes.

In one example implementation, the virtual hard disk 206 refers to a virtual machine template. In another example implementation, the virtual hard disk 206 includes a "stateful" virtual machine where "stateful" generally refers to a virtual machine that has been customized with installation/user specific data and hardware/software components. Upon generating the virtual hard disk copy 214, the storage logic 208 may complete a virtual machine migration that moves the "stateful" virtual machine to the cloud resource 204.

Example embodiments of the example architecture include computer networks that provide data recovery services, such as backup/restore functionality, snapshot creation and/or the like. Components of the example architecture enhance performance of these data recovery services. To illustrate one example of such enhancement, the example architecture enables efficient snapshot creation/modification by providing access to known, common data blocks such that only unknown data blocks, if any, need to be uploaded to complete the snapshot creation/modification. With respect to the virtual hard disk 206, the example architecture may improve an initial snapshot creation phase by decreasing a total time to create a virtual hard disk snapshot prior to a data recovery service assuming control. Accordingly, the example architecture provides the data recovery service, such as Microsoft® Hyper-V® Replica, with an initial virtual hard disk snapshot while avoiding delays caused by uploading known data blocks.

In addition to the network topologies discussed herein (e.g., cloud computing, client/server over a LAN and/or the like), file upload optimization may be realized in hybrid cloud computing environments where substantially large file transfers between clients and on-premises servers, or between on-premises servers and cloud based servers, are executed. In one example hybrid cloud computing environment, an on-premises server may seed a cloud-based block library with local block libraries being used for on-premises file upload operations.

Computer networks employing hardware-assisted or software-assisted copying and/or de-duplication systems, such as Storage Area Networks and Network Attached Storage, can implement the example architecture and achieve a reduction in the data traffic volume necessary to complete file upload, move, and copy operations. Reducing an overall storage capacity of the cloud resource 204 may also be achieved by implementing the example architecture. Accordingly, the cloud resource 204 can handle a same number of users with less storage space.

Figure 3:
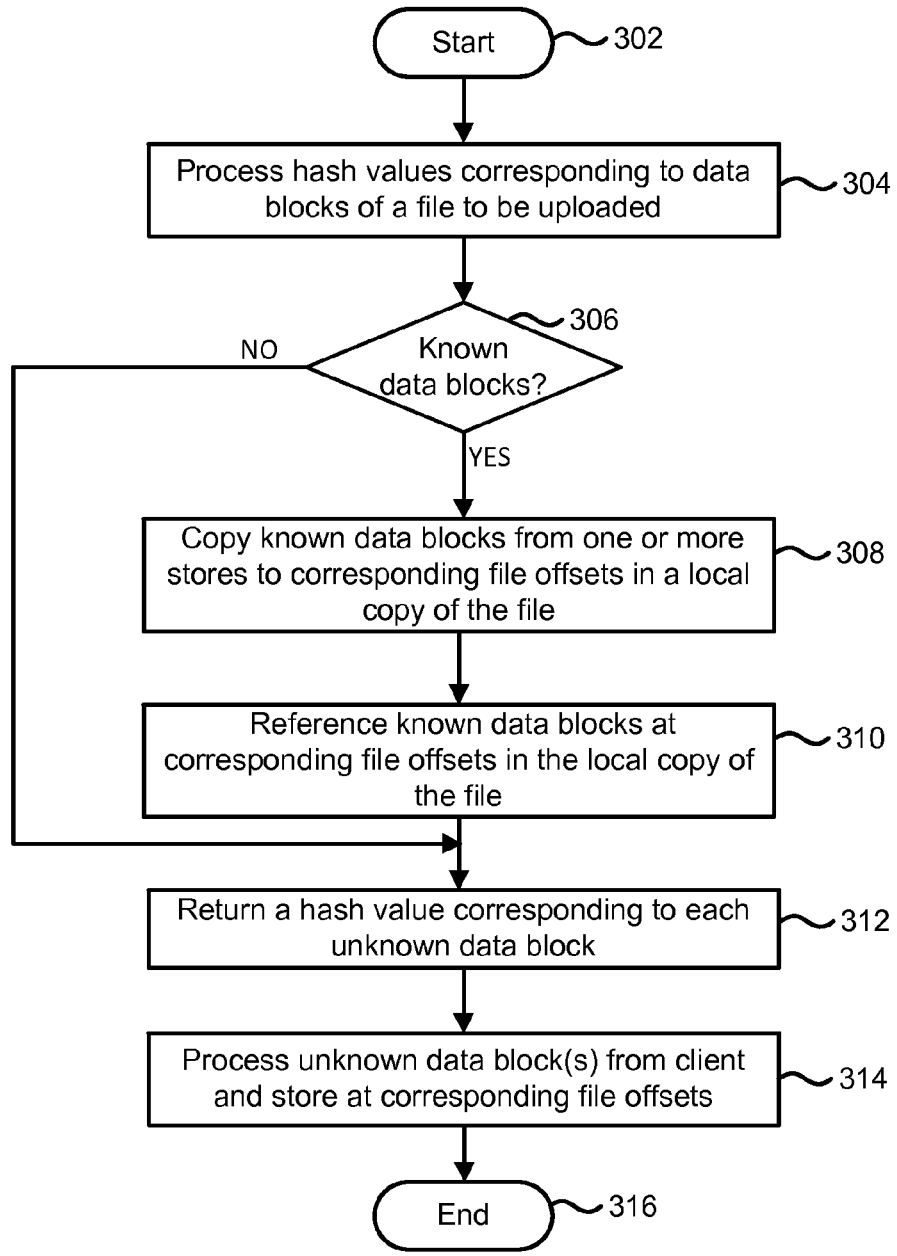
FIG. 3 is a flow diagram illustrating example steps for generating a copy of a file comprising known data blocks according to one or more example implementations.

FIG. 3 is a flow diagram illustrating example steps for generating a copy of a file comprising known data blocks according to one or more example implementation. It is appreciated that some example implementations omit one or more of the example steps. A storage logic running on at least one computing device (e.g., the storage logic 110 of FIG. 1 or the storage logic 208 of FIG. 2) may be configured to perform the example steps. As described herein, the at least one computing device may be configured to support another computing device, referred to as a client, with data processing/storage services and include any combination of the following: a local area network server, a virtual machine, a cloud-based server and/or the like.

Step 302 commences the example steps and proceeds to step 304 where hash values are processed that correspond to data blocks of the file to be uploaded. Based upon these hash values and other indicia, step 306 determines whether any data block of the file can also be found locally with respect to the at least one computing device. The client communicates at least one file upload request comprising the hash values to which the storage logic compares a plurality of known/common data blocks. If the storage logic identifies one or more of these data blocks that resolve to one or more substantially equivalent hash values from the client, each identified data block is determined to be a known data block of the file and step 306 proceeds to step 308. If the storage logic fails to identify any such data block, no known data block exists and step 306 proceeds to step 312.

Step 308 refers to copying at least one known data block from one or more stores to corresponding file offsets in a local copy of the file. The storage logic may execute a local copy operation to retrieve the at least one known data block from the one or more stores, including local data stores, cloud-based stores and/or network-attached stores. Step 310, which may be omitted in some example implementations, is directed towards referencing other known data blocks at corresponding file offsets in the local copy of the file. Some known data blocks are likely not to be used, but can be retrieved, if necessary, from each respective data store. Accordingly, including a reference to a memory location corresponding to a known data block in a local or remote store may further optimize file uploads.

Step 312 returns a hash value corresponding to each unknown data block. The client 202 processes each hash value and transmit one or more unknown data blocks to the server. Step 314 receives the one or more unknown data block(s) from the client and stores each unknown data block at corresponding file offsets in the local file copy. Some example implementations omit step 312 and step 314 if all of the data blocks of the file are known. Step 316 terminates the example steps depicted in FIG. 3.

Figure 4:
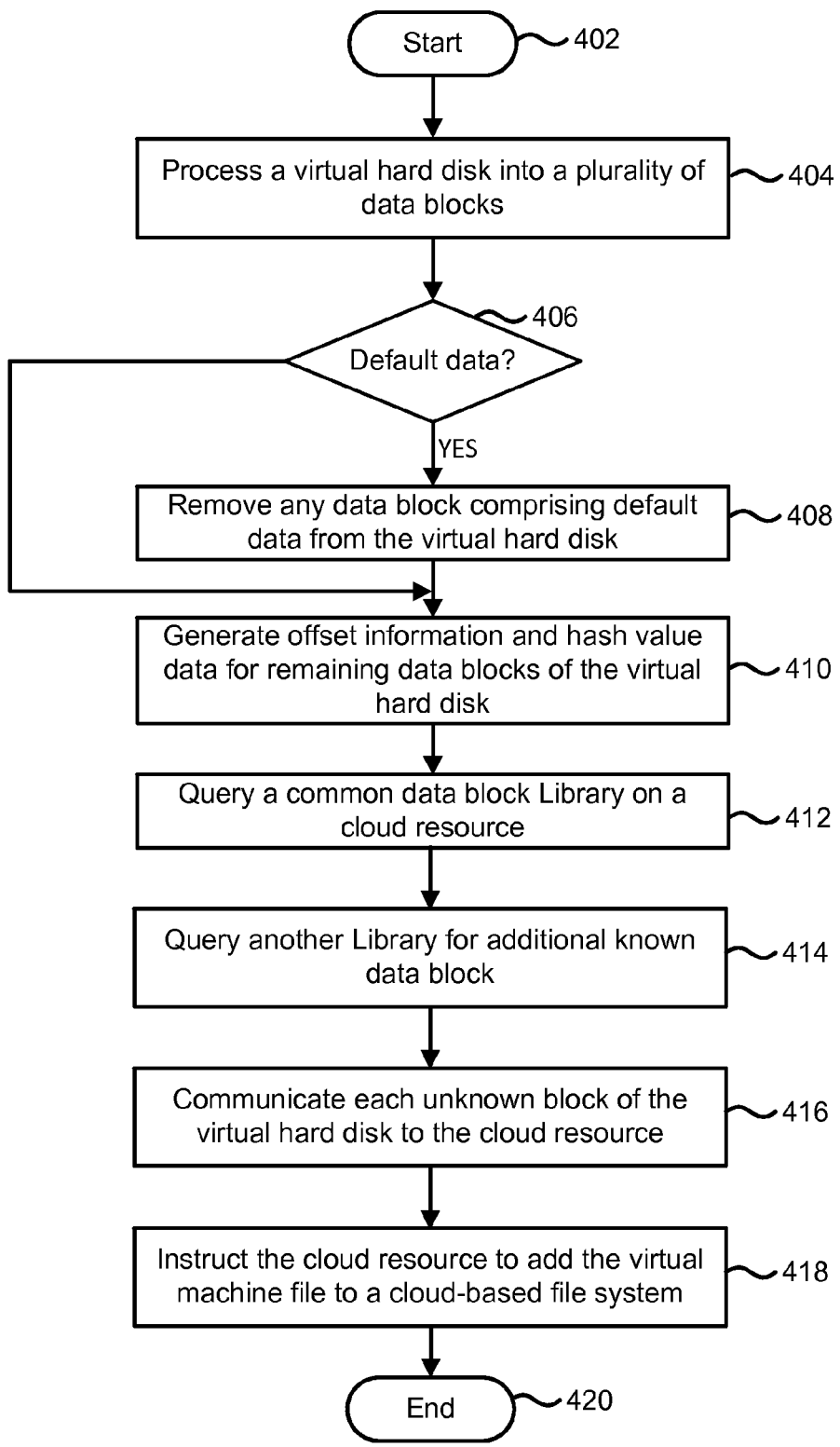
FIG. 4 is a flow diagram illustrating example steps for uploading a virtual machine file using a library comprising data blocks according to one or more example implementations.

FIG. 4 is a flow diagram illustrating example steps for uploading a large file, which in this example is a virtual machine file using a library comprising data blocks according to one or more example implementation. A virtual hard disk file (VHD) represents one example embodiment of the virtual machine file. One or more hardware/software components running on a client device (e.g., a computing device, such as the client 102 of FIG. 1 or the client 202 of FIG. 2) may be configured to perform the example steps. It is appreciated that the library (e.g., the library 112 of FIG. 1 or the library 210 of FIG. 2) may include any combination of commonly used data blocks, most selected data blocks, data blocks anticipated as likely to be selected and/or the like. Step 402 commences the example steps and proceeds to step 404 where a virtual hard disk is processed into a plurality of data blocks.

Step 406 represents a determination as to which ones of the plurality of data blocks include default data. Examples of default data, as described herein, include server-default storage values (e.g., zero (0)). If any data block substantially comprises the default data (e.g., only zero (0) values), step 406 proceeds to step 408 where the client excludes at least one data block from the plurality of data blocks such that the client is precluded from transmitting the at least one data block when completing the virtual hard disk upload. If no data block comprises the default data, step 406 skips step 408 and continues to step 410.

Step 410 is directed towards generating offset information and hash value data for remaining data blocks of the virtual hard disk. Step 412 queries a common data block library residing on a cloud resource using the hash value data to determine which one(s) of the remaining data blocks need(s) to be uploaded to the cloud resource. In one example implementation, the client calls a function requesting that the virtual hard disk file be uploaded with the hash value data as a parameter. A server running on the cloud resource may respond to the client by returning one or more hash values corresponding to one or more data blocks that the server did not find in the common data block library. In one or more example implementations, the client prepares to upload the one or more data blocks to the cloud resource.

In other example implementations, some of the one or more data blocks may not be found in the common data block library but may be found in other block libraries rendering such data blocks to be no longer unknown. Accordingly, step 414 queries another library for additional known data blocks using the hash value data. The other library may include a block library in a local area network or in another cloud resource, such as a private cloud resource or a public cloud resource. If the other library does not contribute towards file upload optimization, step 414 can be omitted.

Step 416 refers to communicating each unknown data block of the virtual hard disk to the cloud resource. The client may arrange the unknown data blocks into groups comprising one or more data blocks and upload each group in parallel to the cloud resource. Using the approaches described herein, if one group upload fails, the client may retry uploading just that group. Instead of uploading the file in piecemeal fashion, for instance, the client uploads only unknown data blocks reducing a total time to complete the file upload process. Step 418 instructs the cloud resource to add the virtual machine file to a cloud-based file system. In one example implementation, the client instructs the storage logic to create the virtual machine file in a BLOB-based file system by allocating storage space in a BLOB, storing the at least one unknown block in the virtual machine file and performing a local copy of at least one known data block into the virtual machine file from the block library or, alternatively, from the other library. The client, as an alternative, may include, at corresponding file offsets in the virtual machine file stored in the BLOB, a reference to each known data block. Step 420 terminates the example steps depicted in FIG. 4.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
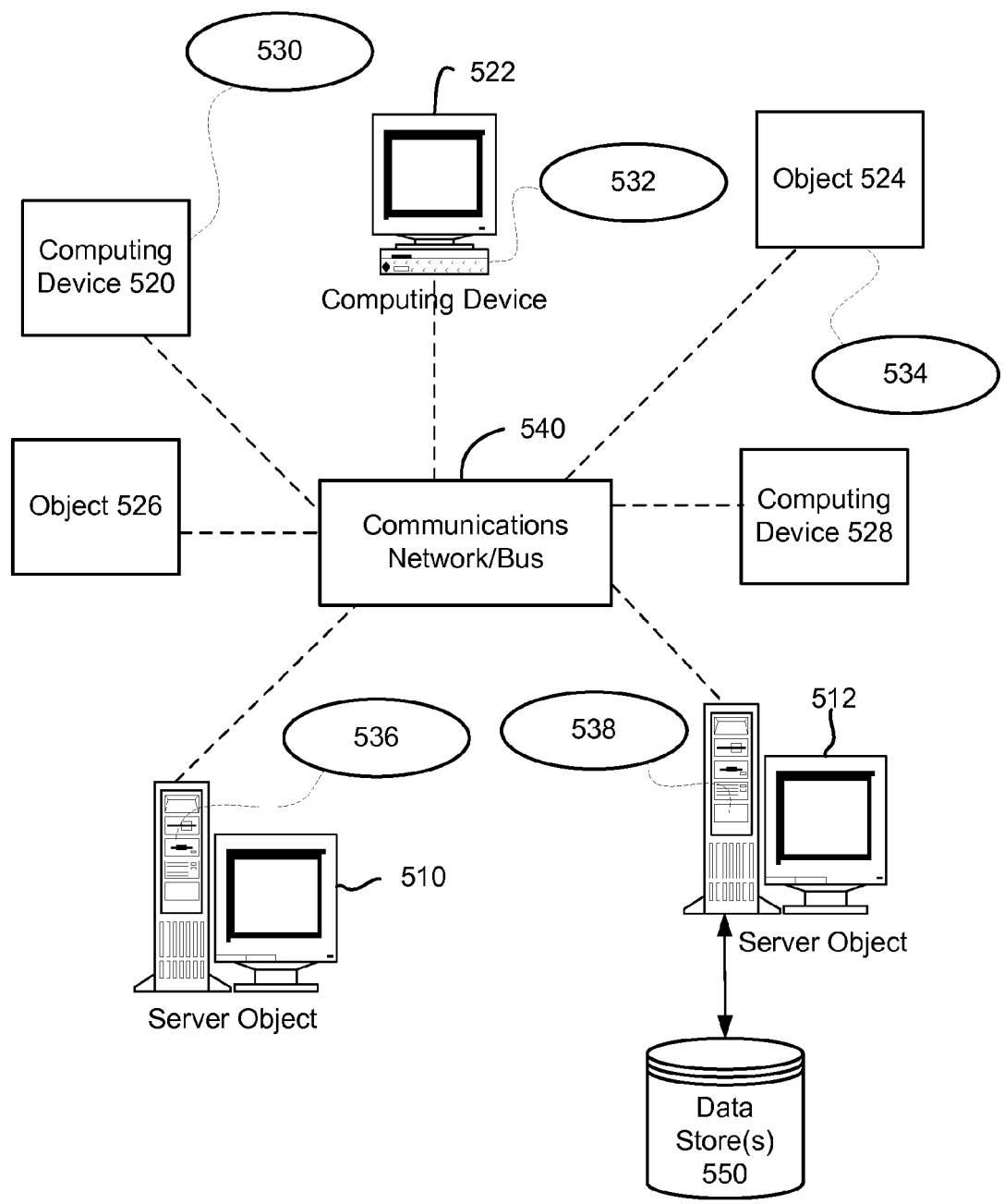
FIG. 5 is a block diagram representing example non-limiting networked environments in which various embodiments described herein can be implemented.

FIG. 5 provides a schematic diagram of an example networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

Figure 6:
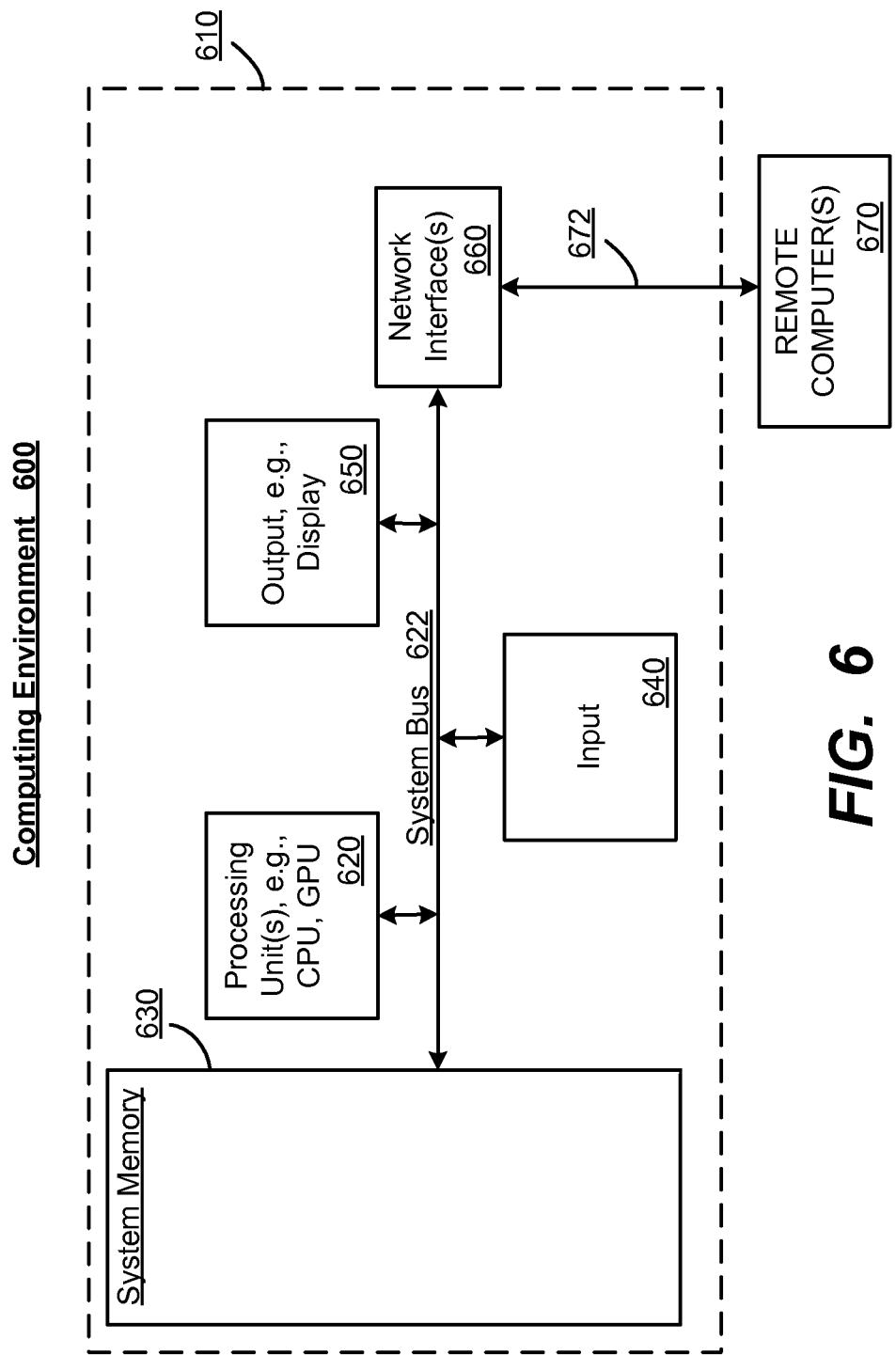
FIG. 6 is a block diagram representing an example non-limiting computing system or operating environment in which one or more aspects of various embodiments described herein can be implemented.

With reference to FIG. 6, an example remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method for reducing data transmission size performed at least in part on at least one processor, comprising:
   receiving, at a server, a request to upload a file data, the request including one or more hash values corresponding to one or more data blocks partitioned from the file data to be uploaded to the server over a network from a client;

comparing, at the server, the one or more hash values to a library corresponding to the one or more data blocks within a server-local store to identify at least one known data block and at least one unknown data block of the file data;

transmitting, to the client, a notification identifying one or more of the at least one known data block and the at least one unknown data block so that the at least one known data block is removed from the file data to be uploaded to the server; and receiving the at least one unknown data block, the at least one unknown data block uploaded to the server over the network from the client.

2. The method of claim 1 further comprising:
creating, in a store coupled to the server, a file comprising the file data using at least one of the at least one known data block and the at least one unknown data block.

3. The method of claim 1 further comprising:
storing a copy of at least one portion of the file data in a store, including performing a copy operation for the at least one known data block, the copy operation comprising a local copy operation of the server.

4. The method of claim 1, wherein identifying the at least one known data block further comprises using a plurality of libraries to identify the at least one known data block.

5. The method of claim 1 further comprising:
accessing the at least one known data block from at least one of a public resource, a private resource, a hybrid resource, or a network storage device.

6. The method of claim 1, wherein identifying the at least one known data block of the file data further comprises processing offset information associated with the at least one known block.

7. The method of claim 6 further comprising:
referencing a copy of the at least one known data block at a first corresponding file offset and storing a copy of the at least one unknown data block at a second corresponding file offset.

8. The method of claim 1 further comprising:
identifying a known data block of which at least a portion of the known data block comprises at least one server-default-storage value.

9. The method of claim 1 further comprising:
returning, to the client, a notification identifying at least one hash value corresponding to the at least one unknown data block to the client so that the at least one known data block is removed from the file data to be uploaded, and storing a copy of the at least one unknown data block at a corresponding file offset.

10. The method of claim 9 further comprising:
adding the at least one hash value to the library corresponding to the data blocks within the server-local store.

11. In a computing environment, a system comprising:
a storage logic implemented within a server and coupled to at least one store, the storage logic configured to handle one or more requests from a client to upload a file data onto the at least one store, wherein the one or more requests comprise client hash value data and offset information corresponding to data blocks partitioned from the file data, the storage logic further configured to access a library comprising library hash value data, compare the client hash value data to the library hash value data to identify at least one known data block of the file data so that the at least one known data block is removed from the file data before the file data is uploaded onto the at least one store, and construct a server-local file copy corresponding to the at least one known data block based upon the offset information.

12. The system of claim 11, wherein the storage logic is further configured to store at least one unknown data block of the file data in the server-local file copy.

13. The system of claim 11, wherein the storage logic is further configured to process at least one unknown data block from the client and generate a snapshot of the file data using file offsets corresponding to the at least one unknown data block.

14. The system of claim 11, wherein the storage logic is further configured to retrieve at least one data block from another store and record, in the library, at least one library hash value corresponding to the at least one data block.

15. The system of claim 11, wherein the client is configured to return at least one unknown data block to the storage logic.

16. The system of claim 11, wherein the storage logic is configured to initially seed the library with reusable data blocks.

17. The system of claim 11, wherein the client is configured to process the file data into the data blocks, remove from the data blocks at least one server-default data block and compute the offset information and the client hash value data for at least one remaining data block of the plurality of data blocks.

18. The system of claim 11, wherein the storage logic is further configured to remove entries from the library.

19. One or more computer storage devices having computer-executable instructions, which upon execution by a computing device cause the computing device to perform operations, comprising:
processing a virtual machine file into a plurality of data blocks;
excluding any portion of the plurality of data blocks that comprises server-default data;
generating offset information and hash value data for remaining data blocks of the virtual machine file;
communicating one or more requests, in parallel, to upload the virtual machine file, wherein a first request includes a portion of the hash value data, including querying a library corresponding to the plurality of data blocks in a network store to identify a known portion and an unknown portion of the remaining data blocks of the virtual machine file;
excluding the known portion of the remaining data blocks from being communicated; and
communicating an unknown portion of the remaining data blocks of the virtual machine file for storing in the at least one store.

20. The one or more computer storage devices of claim 19 having further computer-executable instructions comprising:
instructing a server, running on a cloud resource, to add the virtual machine file to a cloud-based file system associated with the library.

* * * * *